July 15, 1969     P. M. KEENE     3,455,280
DOGFOOD SERVER
Filed May 27, 1966
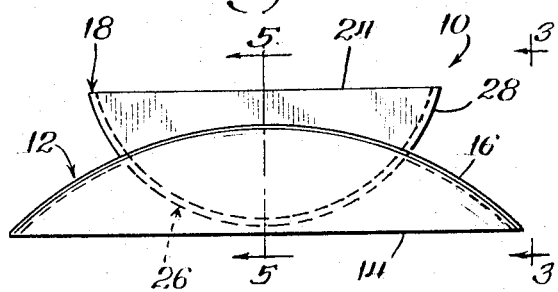
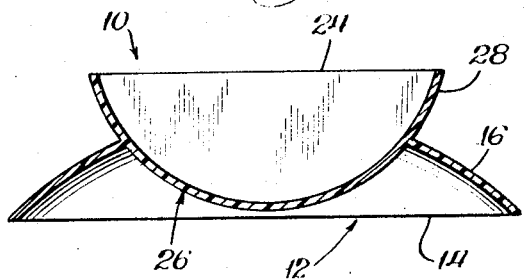
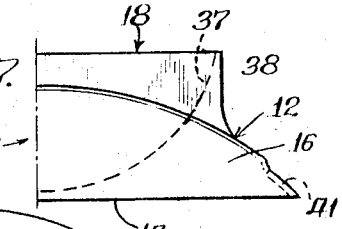
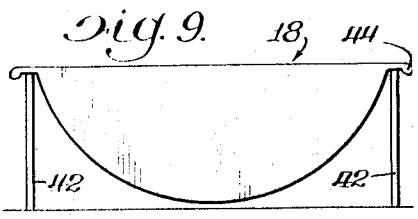
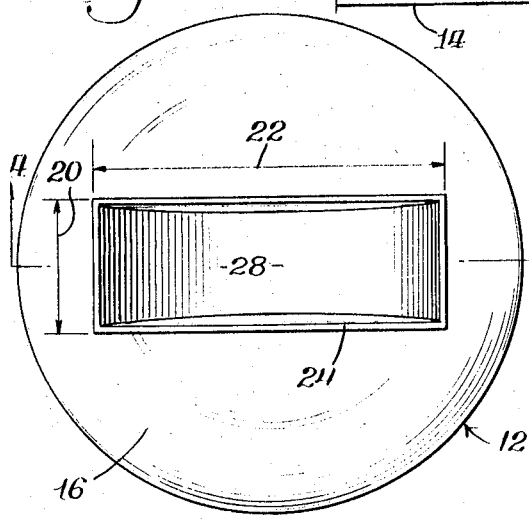
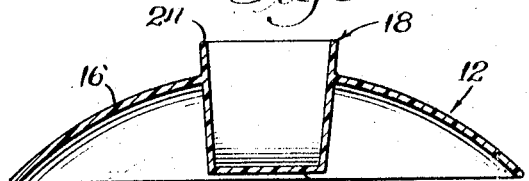
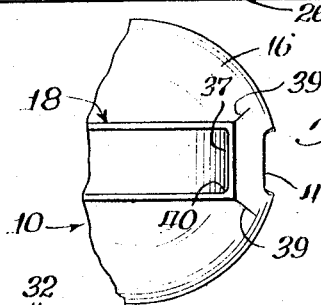
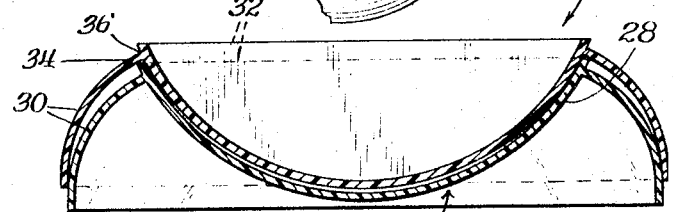
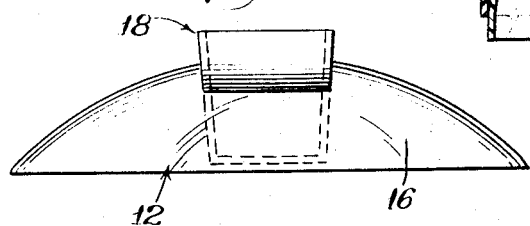
Inventor:
Paul M. Keene
By Paul H. Gallagher
Atty.

United States Patent Office 3,455,280
Patented July 15, 1969

3,455,280
DOGFOOD SERVER
Paul M. Keene, 419 Coster St.,
Hinckley, Ill. 60520
Filed May 27, 1966, Ser. No. 553,334
Int. Cl. A01k 5/00
U.S. Cl. 119—61     3 Claims

ABSTRACT OF THE DISCLOSURE

Dogfood dish having a dish element long and narrow, to accommodate one dog's nose and mouth, the dish element having a bottom surface curved about transverse axis, and a base element surrounding the dish element and resting on the floor and supporting the dish element.

---

The present invention relates to a dogfood server.

A principal object of the invention is to provide a dogfood server of novel construction which provides a number of advantages in the use thereof as follows:

The dog's ears are prevented from dangling in the food while eating, this having been a particularly objectionable disadvantage heretofore.

It is easier for a dog to eat from the server, the food being more confined and prevented from being pushed aside and out of easy eating position.

Less spillage of food occurs both when the dog is eating, and in carrying the server when full, this being particularly advantageous when filled wtih water or other liquid.

Only one dog can eat at a time from a single server, preventing encroaching upon the dog's eating by other dogs, and fighting therebetween.

Additionally it is possible to position the dog while he is eating, by placing the server in a particular position, whereby to locate the dog, when eating, out of an intended path of traffic.

Other objects and advantages of the invention will appear from the following detailed description of the device, taken in conjunction with the accompanying drawings wherein:

FIGURE 1 is a side elevational view of the dogfood server of the invention;

FIGURE 2 is a top view of the device;

FIGURE 3 is also a side elevational view of the device, taken at line 3—3 of FIGURE 1 and showing the dish element therein in end view;

FIGURE 4 is a vertical sectional view of the device, taken at line 4—4 of FIGURE 2;

FIGURE 5 is a vertical sectional view of the device, taken at line 5—5 of FIGURE 1;

FIGURE 6 is a sectional view oriented according to FIGURE 4 but showing a slightly modified construction especially adapted to stacking of the devices;

FIGURES 7 and 8 are fragmentary views of a slightly modified form of device; and FIGURE 9 is a side view of another modified form.

Referring now in detail to the accompanying drawings, the dogfood server is indicated in its entirety at 10 and is preferably a single, unitary, integral article which can be made of any suitable material. The article is particularly adapted to being made of plastic which can be cast in the desired shape by convenient casting methods. However is can be made of other materials such as metals, stainless steel being well adapted because of its resistance to attack by various foods and organic material. It may be stamped as an integral piece, or made of separate pieces secured together as by welding.

The server includes a base element 12 which may be a continuous surrounding skirt element having a bottom edge 14 which in one form lies in a common plane and rests on the floor. The upper surface of this base element may be curved as indicated at 16 in one or both of mutually transverse directions as indicated by comparison in FIGURES 1 and 3. This curved surface may be spherical, or otherwise curved, or of other modified shape as will be referred to later (FIGURE 6). Additionally, it may be other than circular as viewed in plan, such as oval, elliptical, polygonal etc.

The article includes a dish element 18 which is of relatively narrow width in the direction of the double headed arrow 20 but of substantially greater length in the other direction indicated by the double headed arrow 22. The dish element 18 preferably is flat or planar in its top edge 24 and has a lower portion 26 having a bottom surface 28 curved and preferably cylindrical, or nearly so, in shape. The top of the dish element may extend above the base element 12 any desired amount, at least from the standpoint of the dog eating therefrom, and extends down into proximity with the plane of the bottom edge 14. When the server is placed on the floor it is supported stably by the bottom edge 14, and while the dish element 18 may extend to the plane of this bottom edge, in practical manufacture it is preferably disposed slightly above that edge so as to avoid uneven engagement with the floor and consequent rocking of the device. It is of course desired however that the dish element be as deep as practicable for maximum capacity.

The dish element 18 may be tapered downwardly in direction across the short dimension to accommodate stacking of a plurality of the devices, when, in the stack, the lower portion 26 fits within the dish elements in the server therebelow. The curvature of the portion 26 in the opposite direction accommodates stacking in that sense. Such a stacking arrangement is shown in FIGURE 6.

The shape of the servers of FIGURE 6 is slightly different from that described above, for accommodating stacking of the servers in a more compact arrangement. In the present instance the base element 12, instead of being continuously curved throughout its length, as viewed in FIGURES 1 and 4, has end elements 30 disposed more abruptly upright which merge into a top surface 32 which lies in or approaches a straight line disposed in or near the horizontal. In this arrangement the upper edges of the end portions 30 as indicated at 34 extend closer to the uppermost points of the ends of the dish element as indicated at 36, whereby to allow the lower portion of the dish element to extend further down into the dish element therebelow, with consequent more compact stacking.

FIGURE 7 shows a slightly modified form of device. In this case the cylindrical bottom surface of the dish element 18 is extended to substantially a full 180° so that at its ends it is closely adjacent the vertical as at 37. This shape inhibits spillage as in carrying the server, particularly in the case of liquid therein. The outer surface 38 of the dish element is directly vertical at the top and curves outwardly and blends into the skirt portion 16, this latter shape occurring at both the ends and sides of the dish element, in keeping with preferred molding techniques.

The upper portion of the base element 12, (see FIGURE 8) whether it is curved or polygonal as viewed in plan, has corner elements 39 which, in the case of the curved base element, gradually blend into the peripheral surface of the base element as they proceed downwardly, but in the case of a polygonal base element, continue to the bottom surface thereof. Inside corners as at 40 are also curved, facilitating molding.

Also the bottom edge 14 of the base element 12 may be provided with one or more finger spaces 41 preferably under the ends of the dish element 18 to facilitate picking up the server.

FIGURE 9 shows a device that includes a dish element 18 essentially similar to the dish element 18 described above but without the surrounding skirt shaped base portion 12. In the present instance the dish element is supported by a stand or frame 42 which may be a continuous frame, or a plurality of individual legs or components, the dish element having curved lips 44 for detachably resting on the frame or legs. Since the shape of the dish element constitutes the principal feature of the invention, the exact shape and size of the base or supporting means may be as desired.

Dogs, by nature, eat extremely rapidly and have prehensile eating habits, the mouth quickly closing around and enveloping the food. The seizing and conveying of the food to the mouth is largely done by head and jaw movements, the head moving up and down, and the jaws moving back and forth or toward and from each other. Immediately after the food reaches the mouth it is quickly swallowed and again very quickly reaches the stomach. Very little, if any, digestive action takes place in the mouth, as contrasted with various other animals, and by far the greatest part takes place in the stomach and other points beyond the mouth. Hence enabling the dog to eat rapidly works with the natural inclinations and habits and functions of the dog.

This natural activity in a dog eating fast heretofore has generally caused a great amount of scattering of the food out of the server or dish as when a dog moves his head sidewise to pick up other portions of the food with consequent general messiness and sloppiness. In the use of the server of the present invention, the dog does not move his head and mouth sidewise, since it is confined in the long and narrow shape of the dish element and the scattering of the food as referred to is prevented, additionally, since the food is confined against sidewise displacement the dog finds it much easier to pick it up and swallow it.

The curvature of the bottom of the dish element, as indicated by the line 28 also facilitates eating by the dog, since it more closely approaches the line of movement of the end of his mouth as the later is moved back and forth, which is done in an arc or generally curved path, and the dog therefore does not have to reach his mouth or tongue into corners. This shape of the dish also facilitates consumption of liquids or semi-solids which are conveyed to the esophagus by making a ladle of the free end of the tongue. The curvature of the dish element thus facilitates transfer of liquids and semi-solids into the mouth.

The device is dimensioned and proportioned so that the width of the dish element as indicated by the double headed arrow 20 is greater than the width or transverse thickness of the dog's nose, but only slightly greater, there being sufficient latitude to assure comfort to the dog, but not so great as to enable the dog to move his snout sidewise to any appreciable extent. The server may be made in different sizes, for use by different sized dogs, as will be understood.

Another great advantage of the device has to do with hounds and dogs having long drooping ears which extend as far as the end of the dog's snout, or substantially so, since in feeders and dishes heretofore known the ears often dragged in the food. A hound's long ears are often tied up for feeding purposes, to prevent them from falling into the food. This is not only unsightly but often causes mild dermatitis.

Only a single dog can eat from the server at a time, due to the narrow width of the dish element, preventing encroachment on a dog's eating by other dogs, and preventing customary fighting between the dogs.

An additional advantage is that the server can be carried when filled with water or other liquid, with much less chance of spilling it, than in the case of devices heretofore known, by positioning the server, when carrying it, with the long dimension of the dish element transverse to the direction of walking, the generally vertical sidewalls of the dish element minimizing spilling. It works against spilling of liquids by the dog also.

A still further advantage is that the server can be effective to a great extent, in positioning the dog while eating. Since the dog faces in the long direction of the dish element, the server can be correspondingly positioned to position the dog so as to remove it from an intended path of traffic, for example. In the case of a round dish, the dog may move or migrate around the dish and fall into a position obstructing such traffic.

A still further advantage is that the base element is of substantially greater dimensions than the dish element whereby to virtually eliminate its being tipped over by the dog.

I claim:

1. A dogfood server made as a continuous integral article comprising a pair of vertical side walls spaced apart a distance substantially less then their length, means interconnected with the side walls forming a bottom element and end elements which together with the side walls define a dish enclosed on all sides except at the top and there forming an opening lying in a plane, the top opening of the dish having a width on the order of that of a dog's nose and a length substantially greater than its width whereby to enable a dog to enter his nose thereinto and move it freely in longitudinal direction throughout the full length of the dish while effectively preventing its movement in transverse directions, and a base element in the form of a peripherally continuous skirt connected with the dish adjacent the top of the latter and inclined downwardly and outwardly therefrom and terminating downwardly nearly entirely around the article in a bottom edge lying in a plane for resting on a surface supporting the article, and the dish extending downwardly through the base element to a point closely adjacent said plane.

2. A dogfood server according to claim 1, wherein the first mentioned means is continuously curved about transverse axis whereby the bottom element and end elements together lie in a continuously concavely curved surface.

3. A dogfood server according to claim 1 wherein the base element is provided with a notch cut upwardly from the bottom edge to form a finger grip hole to facilitate grasping and lifting the article.

References Cited

UNITED STATES PATENTS

| 2,213,837 | 9/1940 | Gill. | |
| 2,259,682 | 10/1941 | Collins | 119—61 |
| 2,677,350 | 5/1954 | Prestidge et al. | 119—61 |
| 2,928,372 | 3/1960 | Farley | 119—61 |

FOREIGN PATENTS

| 12,941 | 9/1884 | Great Britain. |
| 722,786 | 3/1932 | France. |

HUGH R. CHAMBLEE, Primary Examiner